United States Patent [19]

Bowles

[11] 3,730,666
[45] May 1, 1973

[54] THREADED CLOSURE HIGH PRODUCTION ISOSTATIC MOLDING DEVICE

[75] Inventor: Arnold Gordon Bowles, Warren, Pa.

[73] Assignee: National Forge Company, Irvine, Pa.

[22] Filed: Jan. 10, 1972

[21] Appl. No.: 216,572

[52] U.S. Cl.............425/405 H, 425/128, 425/261, 425/360, 425/437, 425/430, 425/148
[51] Int. Cl............B30b 5/02, B30b 11/02, B28b /300
[58] Field of Search.....................425/128, 261, 360, 425/437, 430

[56] References Cited

UNITED STATES PATENTS

| | | | |
|---|---|---|---|
| 2,290,910 | 7/1942 | Jeffrey | 425/405 H X |
| 2,528,509 | 11/1950 | Goodrich | 425/405 H X |
| 3,193,900 | 7/1969 | Wendt | 425/405 H |
| 3,319,292 | 5/1967 | Witkin | 425/405 H |
| 3,451,101 | 6/1969 | Bowles | 425/405 H X |
| 3,557,405 | 1/1971 | Bowles | 425/405 H X |
| 3,591,903 | 7/1971 | Bowles | 425/405 H X |
| 3,677,674 | 7/1972 | Bowles | 425/405 H X |

Primary Examiner—J. Howard Flint, Jr.
Attorney—Charles B. Smith

[57] ABSTRACT

A high production isostatic molding device comprising an upright isostatic press having an interrupted thread type closure and a turntable for rotating a plurality of elastomeric molds open at one end and hung beneath the table sequentially through various processing stages including filling, pressing and unloading. At one position a given mold is filled with compactible material from a hopper while being simultaneously vibrated. At another position the mold is positioned over the open end of a pressure vessel and lowered into the pressure vessel by a hydraulic ram which simultaneously seals the open end of the mold and lowers an interrupted thread closure plug into engagement with the correspondingly threaded open end of the vessel. An actuator rotates the closure to seal the vessel. An actuator rotates the closure to seal the vessel. After the mold is isostatically compacted by pressurized fluid within the sealed vessel the process is reversed to unseal the pressure vessel and to return the mold to the turntable which thereafter rotates the compacted mold to a stripping position while simultaneously positioning a new filled mold over the open end of the vessel.

8 Claims, 7 Drawing Figures

THREADED CLOSURE HIGH PRODUCTION ISOSTATIC MOLDING DEVICE

BACKGROUND OF THE INVENTION

The present invention relates to isostatic pressure vessels and more particularly to high production isostatic presses.

In most conventional methods of isostatic pressing a molding cycle consists of filling individual molds with compressible molding material, usually in powdered form, closing and sealing these molds, placing the filled molds within a pressure vessel, closing and locking the cover of the pressure vessel, pumping fluid into the pressure vessel to the desired hydrostatic pressure, venting the pressure vessel to relieve the pressure, unlocking and opening the pressure vessel, removing the mold, and finally emptying the molded article or compact out of the mold.

In such conventional systems the molding cycle is relatively slow. The isostatic press stands idle while the mold is being filled with, or emptied of, compact material.

To avoid these problems some high production systems try to improve on the conventional method by the use of a shuttle apparatus to insert and extract the mold from the pressure vessel.

During a single molding cycle in such prior shuttle systems the following sequence of operations takes place with respect to a given mold:

1. the mold is filled with compactible material through its open end and the open end of the mold is then plugged,
2. the mold is aligned into position with the open end of a pressure vessel,
3. the shuttle moves the mold into the vessel, and then moves clear of the vessel,
4. a closure for the vessel is moved into place,
5. the vessel is sealed and the material is isostatically compacted under fluid pressure,
6. the vessel is unsealed and the closure is moved clear of the vessel opening,
7. the shuttle is inserted into the vessel, removes the mold and moves clear of the vessel, and
8. the mold is unplugged and stripped from the compacted material.

Thus at least eight time consuming steps are necessary for one complete molding cycle. As will be hereinafter explained in detail, the present invention reduces the number of required steps to six and further shortens the time required in each of the remaining steps to reduce the duration of the complete molding cycle.

SUMMARY OF THE INVENTION

A preferred embodiment of the present invention comprises an upright, open-ended, isostatic pressure vessel and a turntable supporting a plurality of molds which are rotated through various processing stages including a pressing stage. Each mold has a bag-shaped rubber diagram seated within a perforated metal canister suspended through a recess to hang beneath the turntable from a movable slide.

The turntable carrying the molds is indexed to carry each mold sequentially through a predetermined number of stations. A given mold is first aligned under a hopper which fills the mold with a compactible material. During the filling operation the mold being filled is vibrated to settle the compact material within the mold.

When the filling operation is complete the mold and turntable are then indexed to a second predetermined position or station where the level of the material within the mold and the weight of the mold are checked manually or automatically. The mold is also given extra jogging at this station.

The turntable and filled mold are next indexed to a pressing station placing the mold beneath a hydraulic ram mounted from the top portion of the frame. The ram has a protruding mold end-closure plug as well as a suction line through the plug. A vessel closure plug is also mounted on the ram above the mold plug. Under the mold is the hollow, pressure vessel which is open at its upper end and blind at its lower end. The vessel closure plug has interrupted threads which match a corresponding set of interrupted threads at the vessel mouth. The vessel closure plug is oriented on the ram so that it may be freely inserted into the vessel mouth without interference between the threads of the plug and the threads of the vessel mouth.

The ram is extended downwardly until the mold plug is fully inserted in the open end of the mold. A vacuum is drawn and the ram withdraws upwardly to lift the mold free of the slide beneath the turntable. A hydraulic actuator withdraws the slide to allow the ram to lower the mold into the open end of the vessel. While lowering the mold into the vessel the ram simultaneously lowers the pressure vessel closure into place.

The pressure vessel closure is locked by a hydraulic cylinder which extends to rotate a locking ring in which the closure is seated. As the locking ring is turned the closure turns approximately one-eighth of a complete revolution so that its threads engage the threads of the vessel mouth and the vessel is sealed. Fluid is thereafter injected into the sealed vessel under high pressure through ports in the bottom of the vessel to compact the material isostatically within the mold. The rubber diaphragm prevents the fluid from contacting the material.

After the material is isostatically compacted the vessel is depressurized and the closure is unlocked by retracting the hydraulic cylinder which rotates the locking ring and the closure in the reverse direction one-eighth of a turn. The ram is then withdrawn upwardly to carry the mold and the vessel closure away from the pressure vessel. The ram raises the mold to the level of the table. The forked slide plate is then moved back into place under the mold by a hydraulic actuator. The vacuum drawn through the ram is released and a small amount of air pressure is applied to nest the mold down on to the forked slide. As the mold is nested, the ram is retracted still higher to place it clear of both the turntable and a cover plate which lies above the turntable. The turntable is then rotated to place the compacted mold at an unloading station while simultaneously placing a second filled mold over the vessel to begin another pressing cycle.

The compacted material is extracted from the mold at the unloading station. A vertically retractable arm mounted on a wheeled carriage suspended on a framework over the turntable at the unloading station extends down to fasten on to the end of the compacted material by means of a vacuum pad. The arm is retracted upward, lifting the compact clear of the mold. The arm and carriage are moved horizontally to place the compacted material over a conveyor belt where it is released and carried away for further processing. The empty mold is indexed by the turntable to the filling station to begin another molding cycle.

It should be apparent that the operations at the four positions of the turntable are continuous; there are four molding cycles operating in sequence at the same time.

A high production press according to the invention has the advantage over some conventional isostatic pressing systems of fast cycling while using only one pressure vessel because the operations of filling, jogging, checking and stripping the molds are done outside of the pressure vessel while the vessel is simultaneously pressing a given mold.

Furthermore, the removal of the mold from the pressure vessel is fast relative to prior high production presses involving the use of a shuttle system. In the operation of the present invention only the following six steps are required to complete a molding cycle for any given mold as opposed to the eight steps listed above required of many prior shuttle systems:

1. the mold is filled with material through its open end,
2. the mold is positioned over the open end of the pressure vessel by the turntable (while the previously compacted mold is carried away from the pressure vessel by the turntable),
3. the shuttle inserts the mold into the vessel while simultaneously moving the vessel closure into place and plugging the open end of the mold,
4. the vessel is sealed and the material is isostatically compacted under fluid pressure,
5. the vessel is unsealed and the shuttle withdraws both the compacted mold and the closure from the vessel to reseat the compacted mold in the turntable and simultaneously unplug the mold, and
6. the compacted mold is rotated by the turntable to a position where the mold is stripped from the compacted material.

The use of a shuttle mechanism that carries the vessel closure while simultaneously carrying the mold allows the elimination of the separate steps of inserting the shuttle mechanism with the mold into the pressure vessel and extracting the mechansim and then repeating the operation in the reverse order to remove the compact. Also having the mold plug mounted as part of the vessel closure allows the mold to be closed simultaneously with the sealing of the vessel. A saving in time is thus effected. Since a high production press according to one embodiment of the invention is designed to produce billet shaped compacts at a rate of three per minute this saving in time is economically significant.

While the above preferred embodiment has been designed for pressing compacts in the shape of cylindrical billets, other embodiments are capable of pressing compacts of different shapes and weights. For example, the mold could be comprised of an elastomeric tooling inserted within the rubber bag and in the shape of two spherical halves to produce a round compact. Such an elastomeric tooling could also be in the shape of a rectangle to produce a square or cubic compact. Other shapes might include web or waffle-like structures, bricks, and compacts reinforced with wire or formed on mandrels.

In some embodiments more than one compact may be pressed at the same time, the only limitation being the internal diameter of the pressure vessel cylinder. For example, small individual toolings in the shape of spark plug insulators may be isostatically pressed several at a time.

In these other embodiments the mechanisms for lifting the compacts clear of the molds and for filling the molds initially must be modified from the above described preferred embodiment to fill and strip a predetermined number of molds at one time. It should be noted, however, that the basic apparatus, including the turntable and the press are substantially the same. Because of the isostatic pressing technique, the interior dimensions of the press itself need not be changed to accommodate different shaped molds because regardless of the shape of the mold the fluid pressure is applied evenly and in a normal direction over substantially the entire surface of the mold.

Thus it is an object of the present invention to provide a high production isostatic pressing system having a fast molding cycle while using only one pressure vessel.

It is a further object of the present invention to provide such a pressing system in which the operation of removing one mold from the press and replacing it with another mold is done in a minimum number of steps.

It is still another object of the present invention to provide a high production isostatic pressing system in which the pressure vessel is closed and opened substantially simultaneously with the insertion and removal, respectively, of the mold to be compacted.

The foregoing and other objectives, features, and advantages of the invention will be more readily understood upon consideration of the following detailed description of certain preferred embodiments of the invention, taken in conjunction with the accompanying drawings.

BRIEF DESCRIPTION OF THE DRAWINGS

FIG. 7 is an enlarged vertical view in section and with portions broken away of the portion of the filling station which is encircled by dot dash line 7 of FIG. 1.

DESCRIPTION OF CERTAIN PREFERRED EMBODIMENTS

Figure 1:
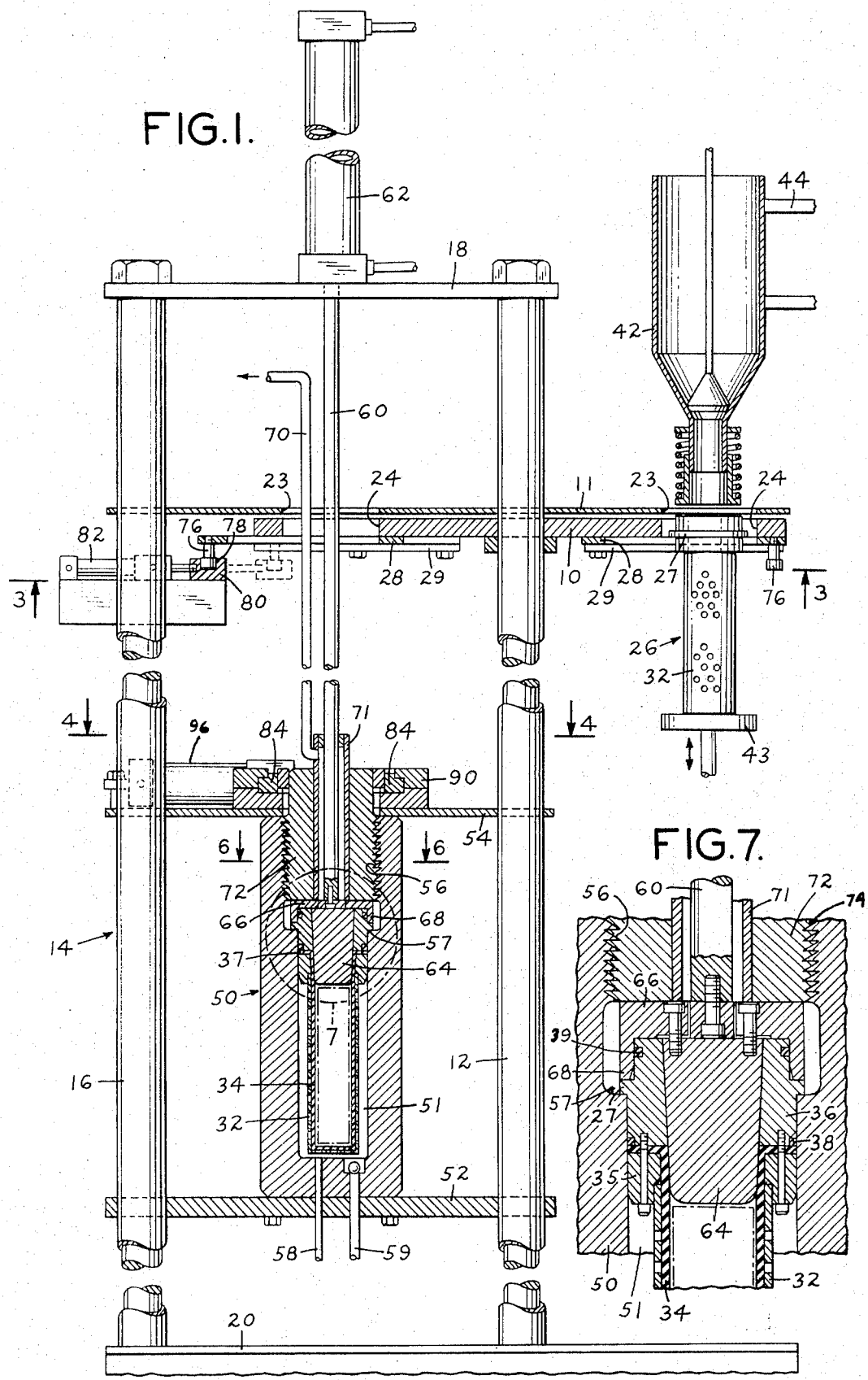
FIG. 1 is a vertical view, partly in section, of the pressing station of a preferred embodiment of the invention.
Figure 2:
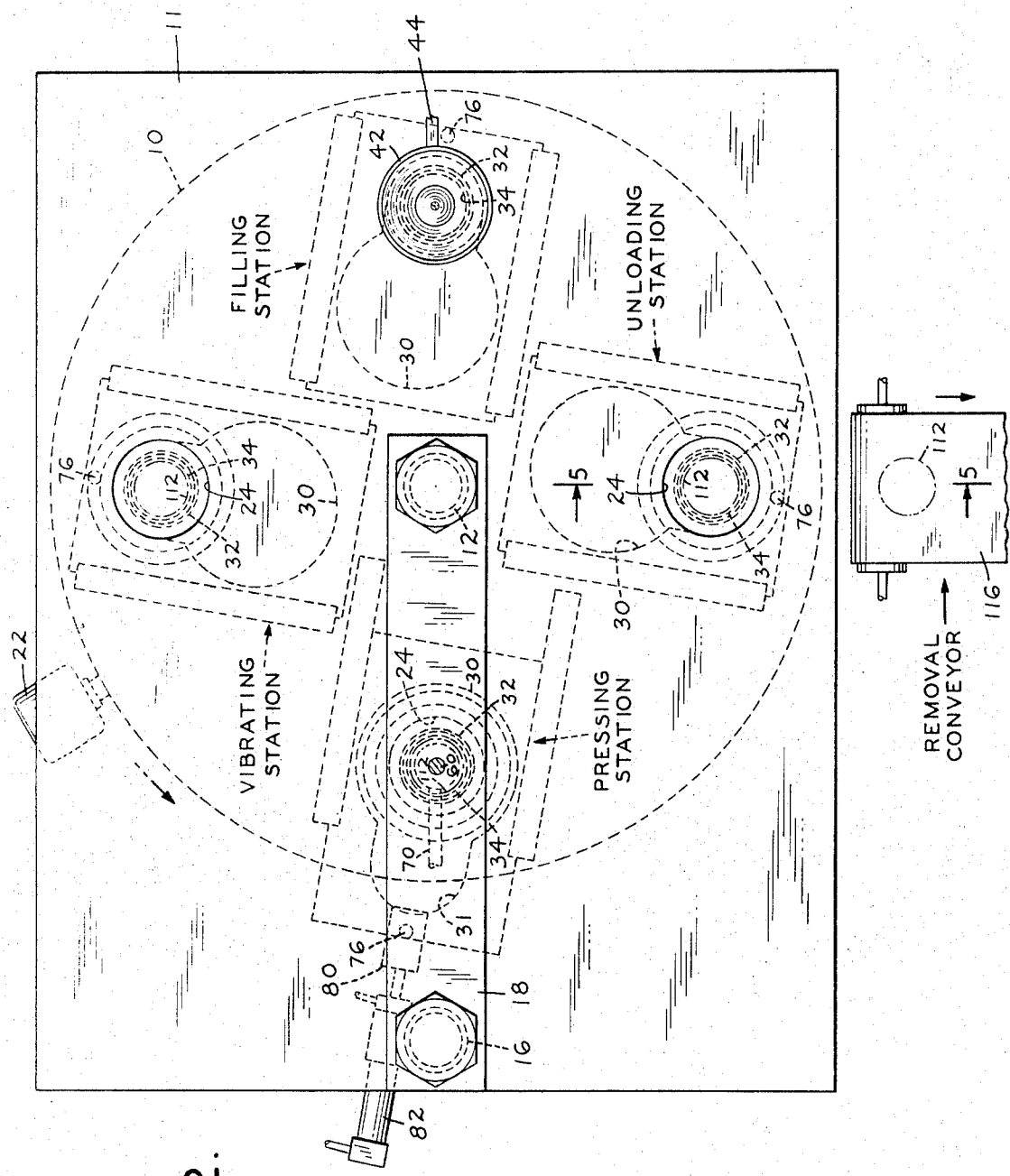
FIG. 2 is a plan view of a preferred embodiment of the invention.

Referring now more particularly to FIGS. 1 and 2 a turntable 10 is mounted for rotation beneath a covering plate 11 and about a vertical tie-member 12 of an upright isostatic press designated generally as 14. The other vertical tie-member 16 of the press is parallel to and opposite from the tie-member 12 so that one-half of the turntable rotates between them. The tops of the tie-members 12 and 16 are joined by an upper, horizontal tie-member 18. The bottoms of the tie-members 12 and 16 are joined by a lower, horizontal tie-member 20 bolted at each end to one of the vertical tie-members.

The turntable 10 is rotated counter-clockwise as viewed in FIG. 2 by a hydraulic or an electric motor operated mechanism 22. The table is provided with four holes or recesses 24 evenly spaced 90° apart from each other through each of which a mold assembly 26 depends. The table rotating mechanism indexes the table such that each one of the four holes is aligned with a separate one of four holes 23 in the covering plate 11 at four operational stations spaced at ninety degree intervals about the table.

A complete molding cycle and the apparatus for carrying it out will now be described with reference to a particular mold. It should be recognized, however, that three other mold cycles are simultaneously being carried out in sequence.

Figure 3:
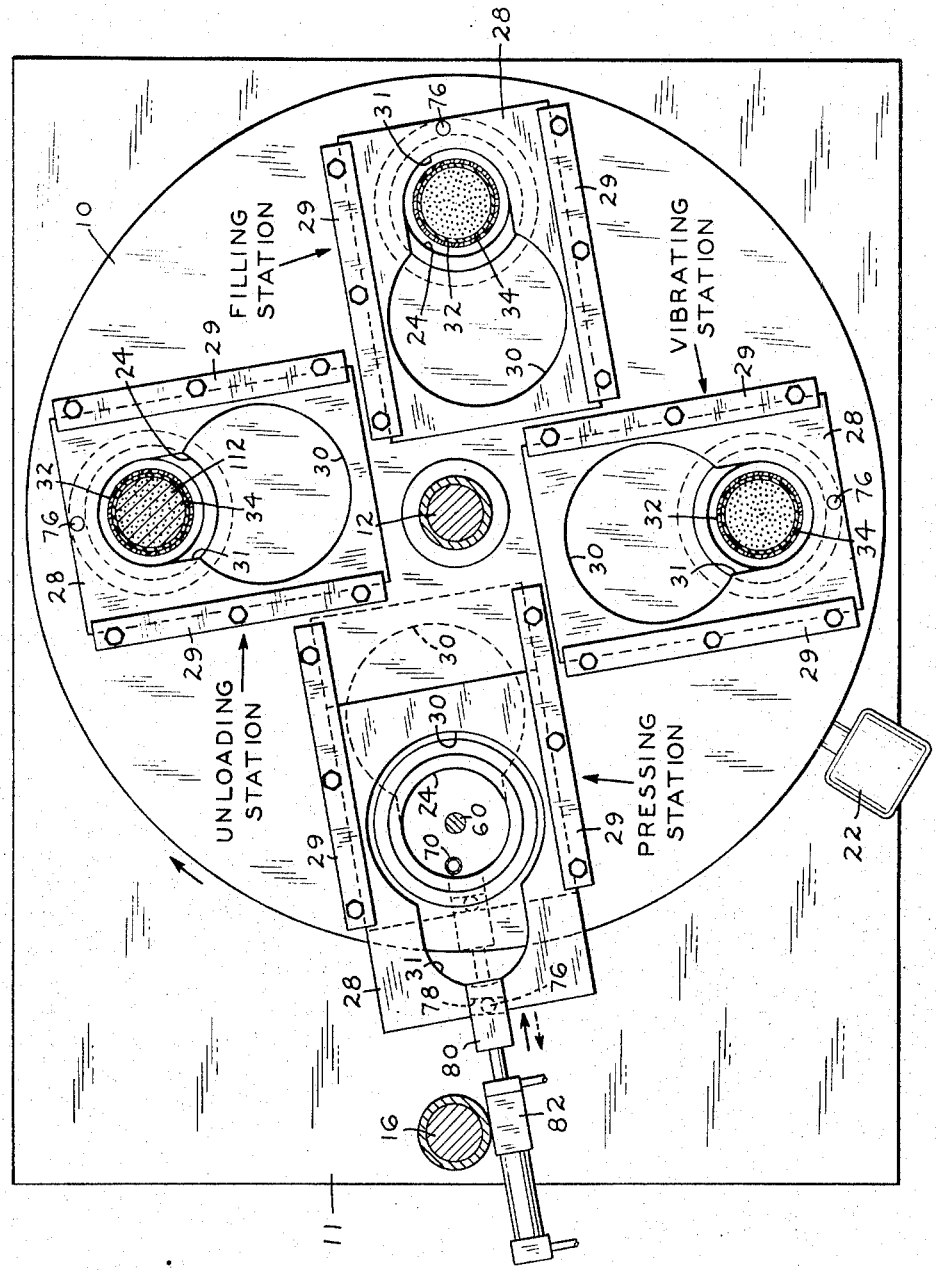
FIG. 3 is a horizontal view, partly in section, taken generally along the line 3—3 of FIG. 1.
Figure 5:
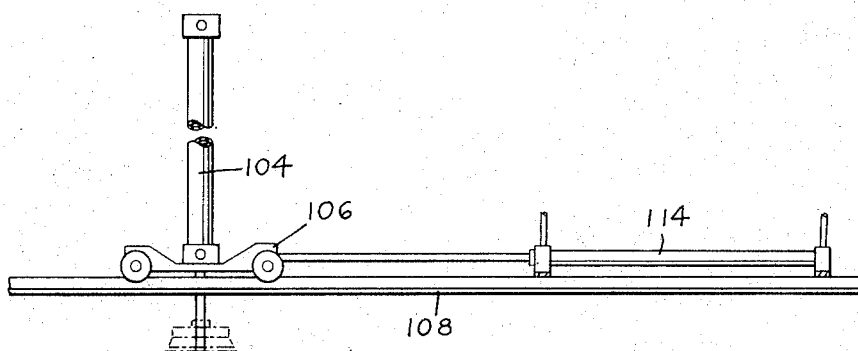
FIG. 5 is a vertical view, partly in section, taken generally along the line 5—5 of FIG. 2 and additionally showing the mechanism for extracting the compacts from the molds as it appears when extended over the turntable.

Referring now more particularly to FIGS. 1, 3 and 5 there is shown a mold assembly 26, having a protruding lip 27. A slide 28, movable between a pair of rails 29 fastened to the underside of the turntable, is situated beneath each recess 24. The slides each have an enlarged hole 30 which allows the complete mold assembly to pass through it when the slide is in a withdrawn position and the axial center of the hole 30 is aligned with the axial center of the recess 24. This position is illustrated by the position of the slide aligned directly over the pressure vessel in FIGS. 1, 2 and 3.

Each slide 28 also has a hole 31, with a reduced diameter adjoining the enlarged hole. The diameter of the smaller hole is such that only the bottom portion of the mold assembly may pass through it when the slide 28 is fully inserted. The slide 28 is fully inserted when the axial center of the smaller hole 31 coincides with the axial center of the corresponding recess 24 and the mold assembly 26 is suspended by the engagement of its lip 27 with the rim of the smaller hole 31.

Referring now more particularly to FIG. 5 the mold assembly comprises a perforated metal canister 32 which contains a rubber diaphragm 34 in the shape of a bag. The blind end of the bag is downwardly oriented. The upper lip of the canister 32 has a metal ring 35 fastened to it. A second metal ring 36 is fastened about the canister ring 35 and the upper lip 37 of the rubber bag 34 is supported by being squeezed between them.

A high pressure O-ring seal 38 between the external, circumferential surfaces of rings 35 and 36 is adapted to seal with the interior walls of the pressure vessel to prevent fluid from contacting the rubber bag's interior. A second O-ring seal 39 is fitted into the circumferential exterior surface of the ring 35 above the projecting lip 27 to aid the cap 66 of the hydraulic ram 60 in making a vacuum seal with the top of the mold as will be explained in greater detail below.

Referring now more particularly to FIGS. 1 and 2, at the first position or filling station of the molding cycle the mold assembly 26 is indexed by the turntable 10 beneath a hopper 42 which is suspended over the covering plate 11 and turntable 10 on a stationery framework 44. The hopper is activated either manually or automatically to fill the rubber bag 34 with the material to be compacted. The hopper feed mechanism is programmed to measure a predetermined amount of compact material into the tooling. Simultaneously with the filling of the rubber bag a retractable vibrating mechanism 43 lifts the mold assembly 26 slightly off the table and vibrates or jogs the mold assembly to settle the powder within the tooling and to ensure an even distribution of the compact material.

The turntable 10 is next indexed counter-clockwise one quarter turn to an extra vibrating and checking station. At this station a mechanism (not shown) beneath the turntable substantially identical to the retractable vibrating mechanism 43 again lifts the mold assembly from the turntable and vibrates the material inside to thoroughly distribute it. The filled mold assembly 26 is also checked for weight and height either automatically or manually against predetermined standards. When a nonconforming mold assembly is detected the machine is stopped for manual adjustment of the fill.

From the checking and extra vibrating station the turntable 10 is again indexed counter-clockwise one quarter turn as viewed in FIG. 2 to the pressing station. The mold assembly 26 is now aligned between the vertical tie-members 12 and 16 of the isostatic press 14.

At the pressing station a hollow pressure vessel 50 is mounted at its blind bottom on a cross member 52 which extends between the vertical tie-members 12 and 16. The upper end of the vessel 50 is affixed to another horizontal cross member 54 fitted between the vertical tie-members 12 and 16. The vessel has an upper open end 56 which has an interrupted thread system. Below the thread system the vessel interior is provided with a shoulder 57 which is adapted to engage the lip 27 of the mold assembly 26 and thereby support it during the pressing cycle. The bottom of the vessel is provided with a high pressure fluid pipe 58 and a low pressure pipe 59 through which pressurized fluid is injected into the vessel and drained from the vessel during the pressing cycle as will be described in detail below. In some relatively low pressure embodiments only a single fill and empty line is required.

A hydraulic ram 60 is retractably mounted in a hoist cylinder 62 which is affixed to the cross member 18 at the top of the press. The hoist cylinder 62 and the ram 60 are aligned with the turntable so that the ram is extendable vertically through the recess 24 in the turntable. The purpose of the ram is to lower the mold assembly and vessel closure into place in the cavity 51 of the pressure vessel prior to pressurization and to remove them after pressurization.

As illustrated in FIG. 1 the ram is fully extended to its lower position. At the lowest end of the ram 60 a cylindrical mold plug 64 is attached. The ram 60 and the mold plug 64 are aligned with the axial center of the mold positioned by the turntable between the upright tie members 12 and 16. Thus when the ram is extended downwardly the plug fits into the end of the mold assembly 26.

Also fitted on the lowest end of the ram and coaxial with the plug 64 is a cap member 66 with downwardly turned edges 68 having a diameter sufficient to cup the upper end of the mold assembly. The edges 68 make a seal with the O-ring seal 39 of the mold assembly 26. Co-axial with the ram 60 is a suction line 71 which is joined to the cap 66. When the cap 66 is firmly seated over the top of the mold assembly 26 suction is drawn through a line 70 connected to the line 71 to produce suction between the cap and the top of the mold assembly so that it is firmly gripped.

Figure 4:
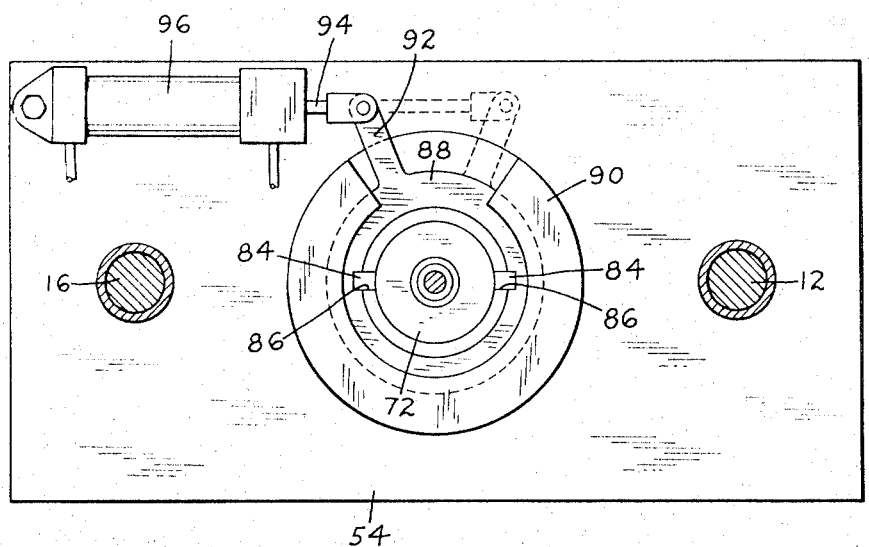
FIG. 4 is a horizontal view, partly in section, taken generally along the line 4—4 of FIG. 1.
Figure 6:
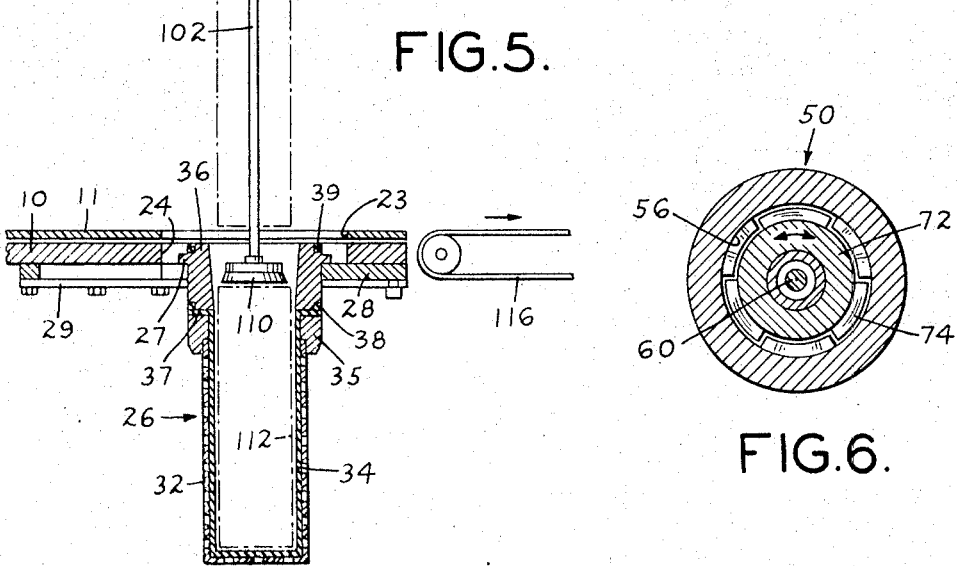
FIG. 6 is a horizontal sectional view taken generally along the line 6—6 of FIG. 1 showing the interrupted thread arrangement of the vessel and its closure.

Fitted on the ram above the cap 66 and coaxial with it is a vessel closure plug 72. The vessel closure plug 72 is equipped with a set of interrupted threads 74 designed to engage with the interrupted thread system 56 of the vessel mouth. The threads of the closure 72 are oriented so as to be non-interfering with the threads of the vessel mouth when the closure is disengaged from the vessel. The threads as illustrated in FIGS. 4 and 6 are shown as non-engaged. In FIGS. 1 and 7 the threads are illustrated as being engaged. By the term "interrupted threads" is meant a breach type thread closure system such as is found on artillery pieces.

Protruding from the underside of each slide 28 at its outermost edge is a downwardly extending leg 76 which fits within a curved groove 78 within a block 80 on the end of a hydraulic actuator 82 mounted on the vertical tie-member 16. When, during the molding cycle, it is necessary to free the mold assembly 26 from the slide 28 the actuator 82 retracts the block 80 to pull the slide radially outward from the center of rotation of the turntable. This moves the axial center of the enlarged hole 30 in the slide into alignment with the axial center of the recess 24 in the turntable.

In operation, after the filled mold assembly is rotated to the pressing station the ram 60 extends downwardly from its fully retracted, up position to grip the mold assembly by means of the suction cap 66. The ram then retracts slightly to lift the mold assembly just clear of the slide 28. The mold assembly 26 is thus prevented from immediately dropping through the turntable when the slide is fully withdrawn by the ram 60 with the mold plug 64 and suction cap 66. In initially gripping the mold assembly the ram 60 also inserts the plug 64 into the open end of the mold assembly 26. The ram assembly 60 is thereafter extended downwardly to place the mold within the cavity 51 of the pressure vessel 50. The closure 72 is fitted into the mouth of the pressure vessel by the ram at the same time.

Referring now more particularly to FIG. 4 the closure 72 is equipped with two projecting key blocks 84 spaced 180° apart on the surface of the closure 72. As the closure is lowered into place with the pressure vessel by the ram 60 the key blocks fit into corresponding key slots 86 in a locking ring 88 mounted to slide rotatably in a curved bracket 90 affixed to the horizontal tie member 54. The locking ring 88 has a protruding leg 92 which extends outwardly from the periphery of the locking ring 88 in the plane of its rotation. The piston 94 of a closure actuator cylinder 96 is pivotally attached to the leg 92. The closure actuator cylinder 96 is mounted on the tie member 54.

As the piston 94 of the closure actuator cylinder 96 is extended the locking ring 88 and the vessel closure 72 are rotated clockwise as viewed in FIG. 5 to seal the vessel by fully engaging the threads of the vessel closure with the threads at the vessel mouth 56. To unseal the vessel the piston 94 of the cylinder 96 is retracted to rotate the locking ring 88 in a counter-clockwise direction as viewed in FIG. 5 to disengage the closure threads.

While the vessel is sealed fluid is injected into the interior of the vessel under high pressure through the lines 58 and 59 in the bottom of the vessel to compact the material isostatically within the mold assembly 26. The rubber diaphragm 34 prevents fluid from contacting the material to be pressed and the mold closure plug 64 makes a seal with the rubber bag at the upper end. After the material is isostatically compacted the vessel is depressurized by opening an external valve (not shown) in the line 58 and suction is applied to drain off the fluid within the vessel.

The closure 72 is unlocked as described above and the hydraulic ram 60 is retracted upwardly carrying the mold 26, the mold plug 64, the suction cap 66, and the vessel closure 72 with it. The ram raises the mold 26 to the level of the table. The slide actuator cylinder extends the block 80 to fully engage the slide 28 in its corresponding rails. When the slide 28 is fully engaged the edge of the smaller diameter hole 31 supports the lip 27 of the mold assembly 26.

The suction through lines 70 and 71 is terminated and a slight inner pressure is applied to drop the mold off the lower end of the ram assembly and seat it on the slide 28. The ram is then withdrawn upwardly so that the bottom of the mold plug 64 clears the top of the mold assembly 26 and the turntable 10 is rotated to bring a new mold to the pressing station for compacting and to rotate the previously compacted mold to the stripping or unloading station.

Referring now more particularly to FIG. 5 the unloading assembly is shown as comprising a vertically retractable arm 102 operated by a hydraulic piston 104. The piston and arm are mounted on a wheeled carriage 106 supported over the turntable by a horizontal frame 108. At the downward end of the arm 102 is a vacuum pad 110.

The compacted material, or simply the "compact," 112 (shown in hidden line fashion for purposes of illustration) is unloaded from the mold assembly 26 by extending the arm 102 until the pad 110 contacts the top of the compact 112. The pad 110 is then vacuum fastened to the top of the compact and the arm is withdrawn, pulling the compact free of the mold assembly. A hydraulic piston 114 attached to the carriage 106 retracts to pull the carriage, the arm 102 and the attached compact 112 over a conveyor belt 116. The vacuum fastening is released to drop the compact 112 onto the conveyor belt 116 which carries the compact away for further processing. The turntable with the now empty mold assembly 26 is again indexed counterclockwise ninety degrees to begin another molding cycle.

In the above description various pistons and actuators have been described as being hydraulic or pneumatic. In other embodiments such devices could be either pneumatically, hydraulically, or electromagnetically operated.

While the preferred embodiment of the invention has been described in reference to molding cylindrical billets, other embodiments use differently shaped molds. It is a feature of the isostatic pressing technique that the pressure vessel itself need not be altered internally, provided it has sufficiently large internal dimensions, to accommodate different shaped molds. The force exerted by the pressurized fluid is exerted isostatically upon the material being compacted, that is, the pressure is normal to every portion of the surface of the mold without regard to the shape of the mold.

It should be apparent that in some embodiments the second stage of weighing and checking the molds can be omitted. In such embodiments the three processing positions are equally spaced about the turntable and it rotates one hundred and twenty degrees between each station.

The terms and expressions which have been employed here are used as terms of description and not of limitation, and there is no intention, in the use of such terms and expressions, of excluding equivalents of the features shown and described, or portions thereof, it being recognized that various modifications are possible within the scope of the invention claimed.

What is claimed is:

1. An isostatic molding device of the type wherein high pressure fluid compacts loose material contained within a mold inside a sealed pressure vessel wherein the improvement comprises rotatable support means for sequentially advancing a plurality of molds through at least three discrete predetermined radial positions about a common axis, means for filling each mold in turn at a first radial position with the loose material, an upright isostatic press located at a second radial position for sequentially compacting the material in each mold, the press including a surrounding frame which straddles a portion of the rotatable support means, a hollow pressure vessel mounted in the frame beneath the rotatable support means, the pressure vessel having a threaded open upper end, a closure having threads engageable with the open end of the pressure vessel, means for transporting each mold, in turn, from the rotatable support means at the second radial position into the pressure vessel while substantially simultaneously positioning the threaded closure into the open end of the pressure vessel and for carrying out the same sequence in reverse order after the compaction of the material within the pressure vessel, means for rotating the closure to seal and unseal the pressure vessel, means for isostatically compacting the material within the sealed pressure vessel by injecting pressurized fluid into the pressure vessel, and means located at a third radial position for removing the compacted material from each mold in turn.

2. An isostatic molding device as recited in claim 1 further comprising means located at the second radial position for vibrating each mold as it is being filled by the filling means.

3. An isostatic molding device as recited in claim 1 wherein the rotatable support means comprises a turntable having a plurality of holes in its surface at regular circumferential intervals through which the separate molds depend, means mounted on the turntable for selectively gripping each depending mold, and means for advancing the turntable in discrete, equal fractions of a complete revolution.

4. An isostatic molding device as recited in claim 3 wherein each mold comprises a perforated metal canister, a bag-shaped diaphragm, the diaphragm being disposed within the metal canister with its blind end downward.

5. An isostatic molding device as recited in claim 1 wherein the means for removing the compacted material from each mold comprises a frame which extends over the rotatable support means, a wheeled carriage movably mounted on the frame, a downwardly extending arm mounted on the wheeled carriage, a vacuum pad mounted at the downward end of the arm, and means for moving the wheeled carriage and the arm horizontally upon the frame.

6. An isostatic molding device as recited in claim 1 wherein the means for transporting the molds between the rotatable support means and the pressure vessel comprises a hydraulic ram vertically mounted on the frame, the ram having a lower extendable end, a plug adapted to close the open end of each mold, in turn, as each mold is placed into the pressure vessel, the plug being mounted on the ram at its lower end, suction means mounted on the lower end of the ram and adapted to be engageable with and grip the top of each mold, in turn, and the pressure vessel closure being mounted on the lower end of the ram above the mold plug.

7. A high production isostatic molding device as recited in claim 1 comprising a turntable indexed to advance in substantially equal fractions of a complete revolution to a filling position, a checking position, a pressing position and an unloading position.

8. A high production isostatic molding device for compacting loose material comprising a plurality of molds, each mold including a perforated metal canister and a bag-shaped diaphragm disposed within the canister, a turntable indexed to advance in fractions of a complete turn to at least a first, a second and a third radial position about a common axis, the turntable having a plurality of holes in its surface which are evenly spaced circumferentially about the turntable with each mold being suspended through a separate hole in the turntable, hopper means located at the first radial position for filling a select mold with the loose material, means for vibrating the select mold to settle the material, an isostatic press arranged so as to straddle a portion of the turntable at the second radial position, the press including an upright frame, a hollow pressure vessel mounted in the frame beneath the turntable, the pressure vessel having an upper open end equipped with an interrupted thread system, a closure plug adapted to seal the open end of the pressure vessel, the closure plug having an interrupted thread system for engagement with the thread system of the pressure vessel, vertically extendable means for simultaneously lowering the select mold and the vessel closure into predetermined positions in the open end of the pressure vessel prior to pressing and raising the same out of the pressure vessel after pressing, means for rotating the closure while it is in its predetermined position in the pressure vessel to seal and unseal the pressure vessel, means for isostatically compacting the material within the sealed pressure vessel by injecting pressurized fluid into the pressure vessel, and means located at the third radial position for removing the compacted material from the select mold.

* * * * *